United States Patent
Gailloux et al.

(10) Patent No.: US 8,509,834 B1
(45) Date of Patent: Aug. 13, 2013

(54) METHOD AND COMPUTER-READABLE MEDIUM FOR SOCIAL CIRCLE PUSH-TO-TALK SERVICE

(75) Inventors: Mike Gailloux, Overland Park, KS (US); Kenneth W. Samson, Belton, MO (US); Brian A. Gavin, Overland Park, KS (US)

(73) Assignee: Nextel Communications Inc., Overland Park, KS (US)

( * ) Notice: Subject to any disclaimer, the term of this patent is extended or adjusted under 35 U.S.C. 154(b) by 351 days.

(21) Appl. No.: 12/470,661

(22) Filed: May 22, 2009

(51) Int. Cl.
| | |
|---|---|
| H04B 7/00 | (2006.01) |
| H04M 11/00 | (2006.01) |
| H04M 3/42 | (2006.01) |
| H04M 1/64 | (2006.01) |
| H04W 4/00 | (2009.01) |
| H04L 12/16 | (2006.01) |
| H04Q 11/00 | (2006.01) |
| G06F 15/16 | (2006.01) |
| G06F 15/173 | (2006.01) |

(52) U.S. Cl.
USPC .......... 455/518; 455/406; 455/416; 455/466; 370/260; 370/270; 379/68; 709/204; 709/223

(58) Field of Classification Search
USPC .......... 455/41.2, 403, 413, 414.1, 414.2, 455/415, 416, 420, 435.1, 447, 450, 456.3, 455/457, 458, 461, 466, 509, 511, 517, 518, 455/519, 520; 370/260–271, 312, 335, 395.2, 370/473; 379/202.01; 709/204, 223, 227
See application file for complete search history.

(56) References Cited

U.S. PATENT DOCUMENTS

| | | | |
|---|---|---|---|
| 6,870,916 B2 * | 3/2005 | Henrikson et al. | 379/202.01 |
| 2004/0015548 A1 * | 1/2004 | Lee | 709/204 |
| 2004/0030620 A1 * | 2/2004 | Benjamin et al. | 705/32 |
| 2004/0141606 A1 * | 7/2004 | Torvinen | 379/202.01 |
| 2004/0249949 A1 * | 12/2004 | Gourraud et al. | 709/227 |
| 2004/0267882 A1 * | 12/2004 | Whynot et al. | 709/204 |
| 2005/0226230 A1 * | 10/2005 | Dorenbosch | 370/352 |
| 2005/0249153 A1 * | 11/2005 | Park et al. | 370/328 |
| 2006/0040695 A1 * | 2/2006 | Yoon et al. | 455/519 |
| 2007/0123287 A1 * | 5/2007 | Mock et al. | 455/518 |
| 2010/0029316 A1 * | 2/2010 | Kaushik et al. | 455/519 |
| 2010/0167763 A1 * | 7/2010 | Bouthemy et al. | 455/466 |
| 2010/0195578 A1 * | 8/2010 | Razdan et al. | 370/328 |

* cited by examiner

*Primary Examiner* — Andrew Wendell
*Assistant Examiner* — Paul P Tran

(57) ABSTRACT

A method and computer-readable medium for establishing a push-to-talk social group are provided. According to the method, group setup information is received from a member of the push-to-talk social group, and a data transmission, including an internet address of an internet application that manages push-to-talk social groups, is sent to each member of the push-to-talk social group. Push-to-talk calling may be monitored in a push-to-talk gateway application, based upon the group setup information. When a push-to-talk call is detected in which a first member of the push-to-talk social group is active, other members of the push-to-talk social group are informed that the first member is active on the detected push-to-talk call. Other members of the group may then initiate a push-to-talk call with the first member.

13 Claims, 4 Drawing Sheets

US 8,509,834 B1

METHOD AND COMPUTER-READABLE MEDIUM FOR SOCIAL CIRCLE PUSH-TO-TALK SERVICE

BACKGROUND OF THE INVENTION

Wireless communication networks typically provide a number of different services, such as voice and data communication services. Most wireless communication networks typically offer a single type of voice communication service known as interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two communication endpoints. A push-to-talk call requires floor control to ensure that only one endpoint has permission to talk at any particular time during the call. Push-to-talk communication services have historically been employed in private wireless communication networks by, for example, taxi cab companies or emergency service agencies (e.g., police and fire departments).

One of the most recognized advantages of push-to-talk calls compared to interconnect calls is the fast call setup time. For example, push-to-talk calls are typically setup in less than one second, whereas interconnect calls may not even begin to ring the called party in this time. Private wireless communication networks and the iDEN network are able to provide push-to-talk calls with a fast setup time because these networks are specifically designed to provide these types of calls.

Existing push-to-talk service, however, does not provide for social networking among a group of push-to-talk users. Rather, a user must decide whether to contact another user without knowledge of other users activity on the push-to-talk network.

SUMMARY OF THE INVENTION

The present invention solves the above-mentioned problem of the prior art by providing a method and computer-readable medium that allow users to establish push-to-talk social groups and receive notifications when one of the members of the push-to-talk social group is currently active in a push-to-talk call. Thus, members of the push-to-talk social group can contact each other more easily.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
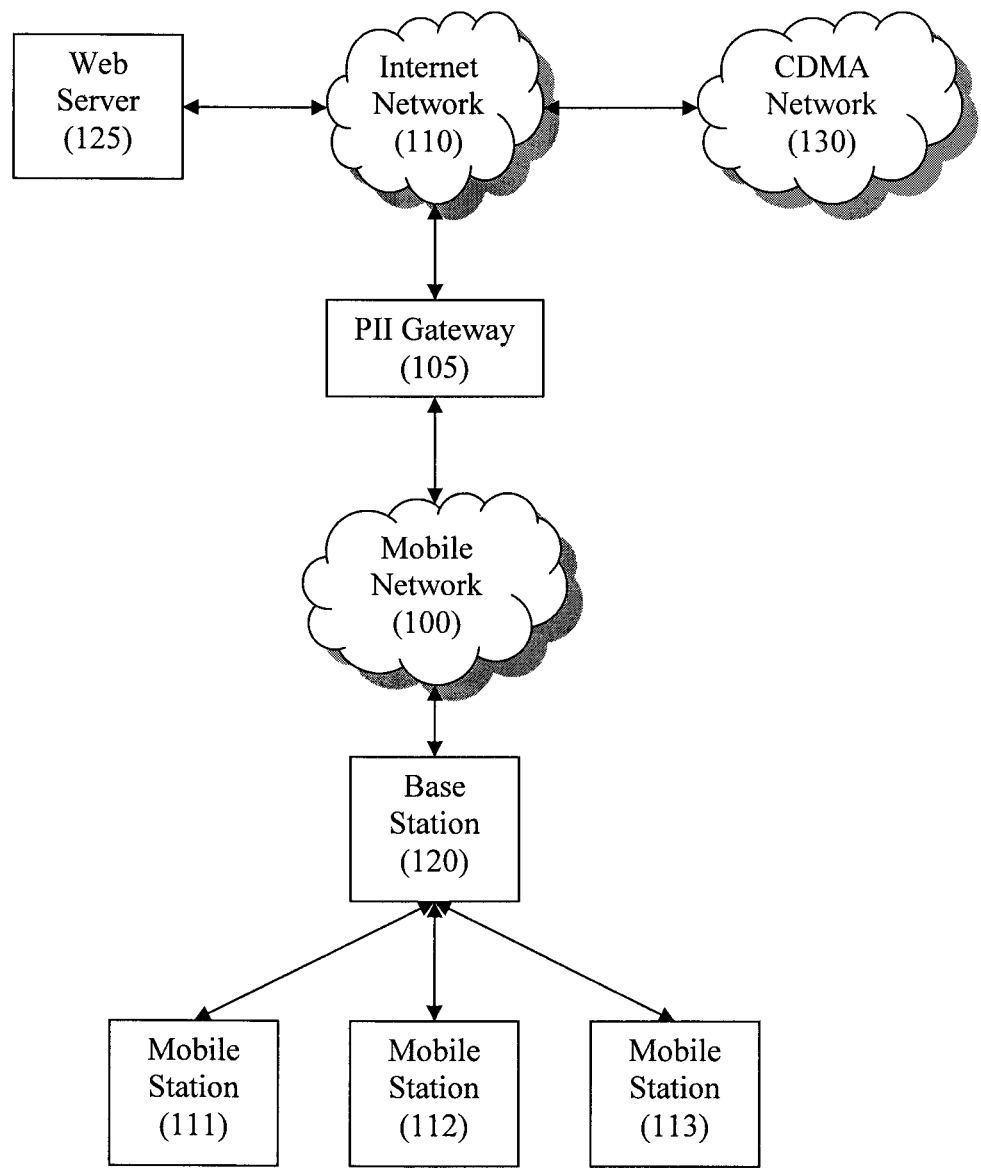
FIG. 1 illustrates an exemplary embodiment of a system in accordance with the present invention.

FIG. 1 illustrates an exemplary embodiment of a system in accordance with the present invention. The system may include a Mobile Network 100, PTT Interoperability Infrastructure (PII) Gateway 105, and an Internet Network 110. The system may further include another network, such as a CDMA Network 130. Mobile Stations 111, 112 and 113 communicate in the Mobile Network 100 via an air interface through a Base Station 120. The Mobile Station 115 may be a mobile telephone or the like that has the capability to perform push-to-talk communications. The number of components illustrated in FIG. 1 is only exemplary, since the number of components (e.g., mobile stations, base stations, etc.) can be varied as desired.

The PII Gateway 105 connects the Mobile Network 100 to the Internet Network 110 and acts as a traffic aggregation point within the system. The PII Gateway 105 also acts as a gateway between the Mobile Network 100 (e.g., an iDEN® network) and another mobile network such as a CDMA Network 130 or other network. Connected to the Internet Network 110 is a Web Server 125. The Web Server 125 is provided by a push-to-talk service provider to facilitate internet communications for mobile stations in the Mobile Network 100.

Figure 2:
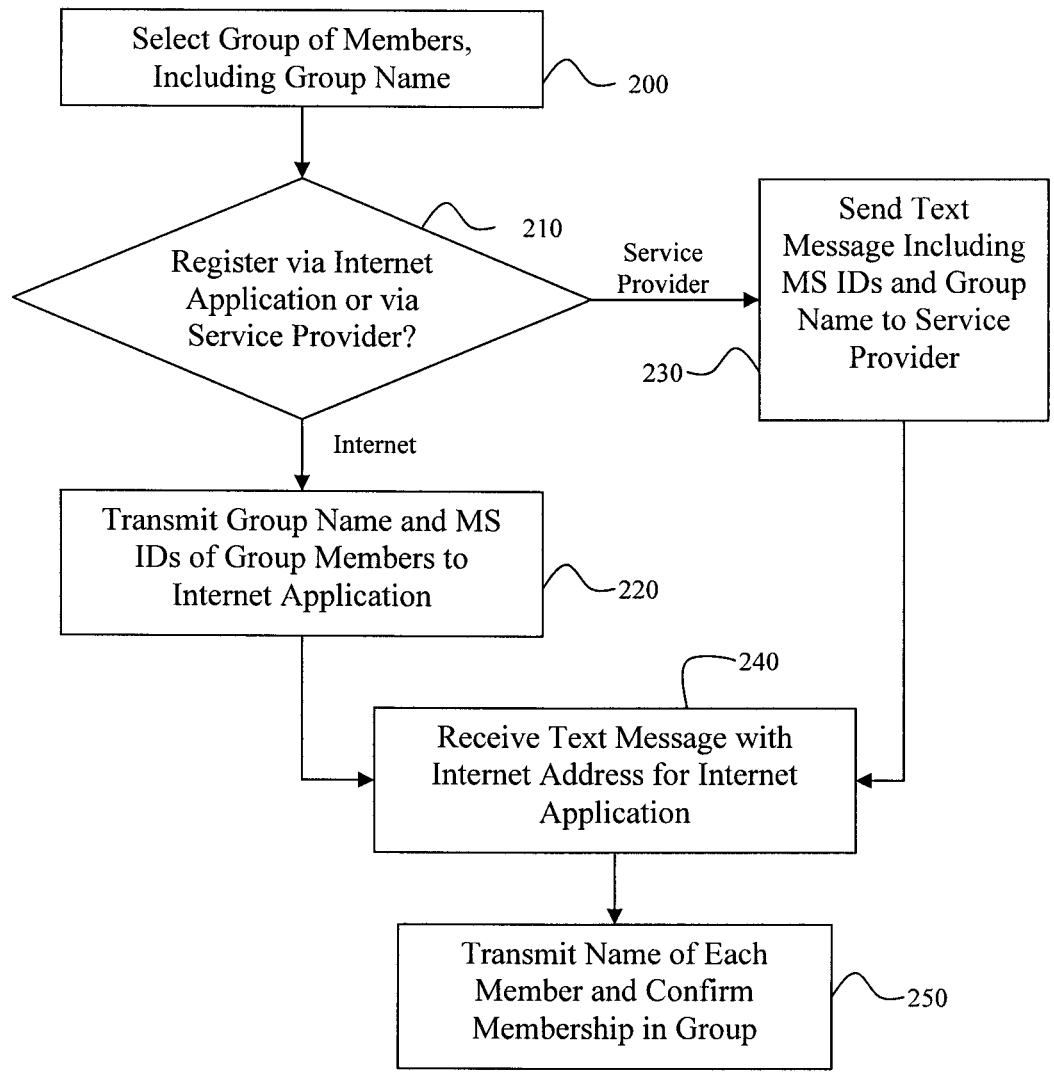
FIG. 2 illustrates an exemplary embodiment of a method for establishing a push-to-talk social group via a mobile station, in accordance with the present invention.

FIG. 2 illustrates an exemplary embodiment of a method for establishing a push-to-talk social group via a mobile station. In step 200, users select which push-to-talk users are going to become part of a push-to-talk social group and what name the group will have. In particular, a plurality of users may decide to establish their own social group for push-to-talk communications. In step 210, a user chooses between setting up the push-to-talk social group via an internet application and via a push-to-talk service provider. The internet application may be accessible via mobile station, computer, or any other device capable of internet access.

If the user chooses to set up the push-to-talk group via the internet application, then, in step 220, the user transmits the group name and a mobile station identifier for each member of the push-to-talk social group to the internet application. On the other hand, if the user chooses to register the group via the PTT service provider, then, in step 230, the user sends a data transmission (e.g., a text message or the like) to the service provider so that the service provider can set up the push-to-talk social group for the group members.

In response to receiving the group information in step 220 or step 230, the internet application or the service provider sends a message to the group members notifying them that their group information was received and requesting them to confirm their membership in the group. Thus, in step 240, each of the members of the push-to-talk social group receives a data transmission, such as a text message or the like, including an internet address (i.e., a URL) for the internet application that manages communications in the push-to-talk social group. In order to verify that the members of the push-to-talk social group intend to be in the group, they each send a message back to the internet application, in step 250, confirming their membership in the group and including a name associated with the membership.

Figure 3:
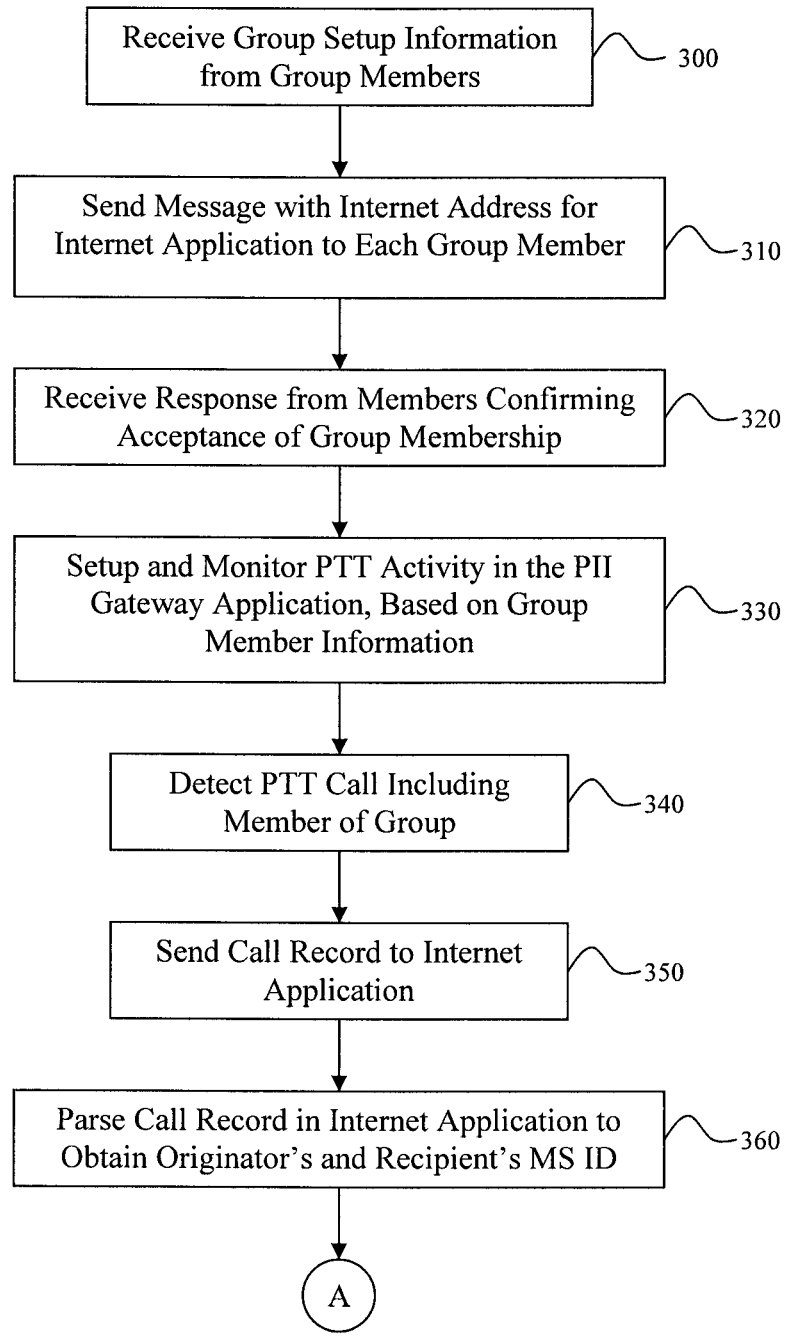
FIG. 3 illustrates exemplary embodiment of a method for establishing a push-to-talk social group via an internet application, in accordance with the present invention.

FIG. 3 illustrates an exemplary embodiment of a method for establishing a push-to-talk social group via an internet application. In step 300, group setup information is received by an internet application that manages communications in push-to-talk social groups, from a user of a mobile station. In particular, the group setup information may include a group name for the push-to-talk social group and a mobile station identifier for each of the members of the group.

In step 310, the internet application sends a message (e.g., a text message) including an internet address for the internet application that manages push-to-talk communications for the group to each group member. In step 320, the internet application receives a response from each of the group members confirming their acceptance of membership in the group, including a name associated with each membership.

Based on the received group information, the push-to-talk social group is established in step 330, and push-to-talk calling activity in the PII Gateway 105 is monitored to determine whether any members of any push-to-talk social groups are involved in a push-to-talk call. In an exemplary embodiment of the present invention, a program for monitoring the push-to-talk calling activity is present in a push-to-talk calling server.

In step 340, a push-to-talk call including a member of one of the monitored push-to-talk social groups is detected. In step 350, a call record for the detected call is sent to the internet application that manages the push-to-talk social groups. In step 360, the internet application parses the call record to determine a mobile station identifier of the originator and a mobile station identifier of the recipient of the detected call. The mobile station identifiers may be, for example, an Urban, Fleet, Mobile Station Identifier (UFMID) and/or phone number of the mobile station.

Figure 4:
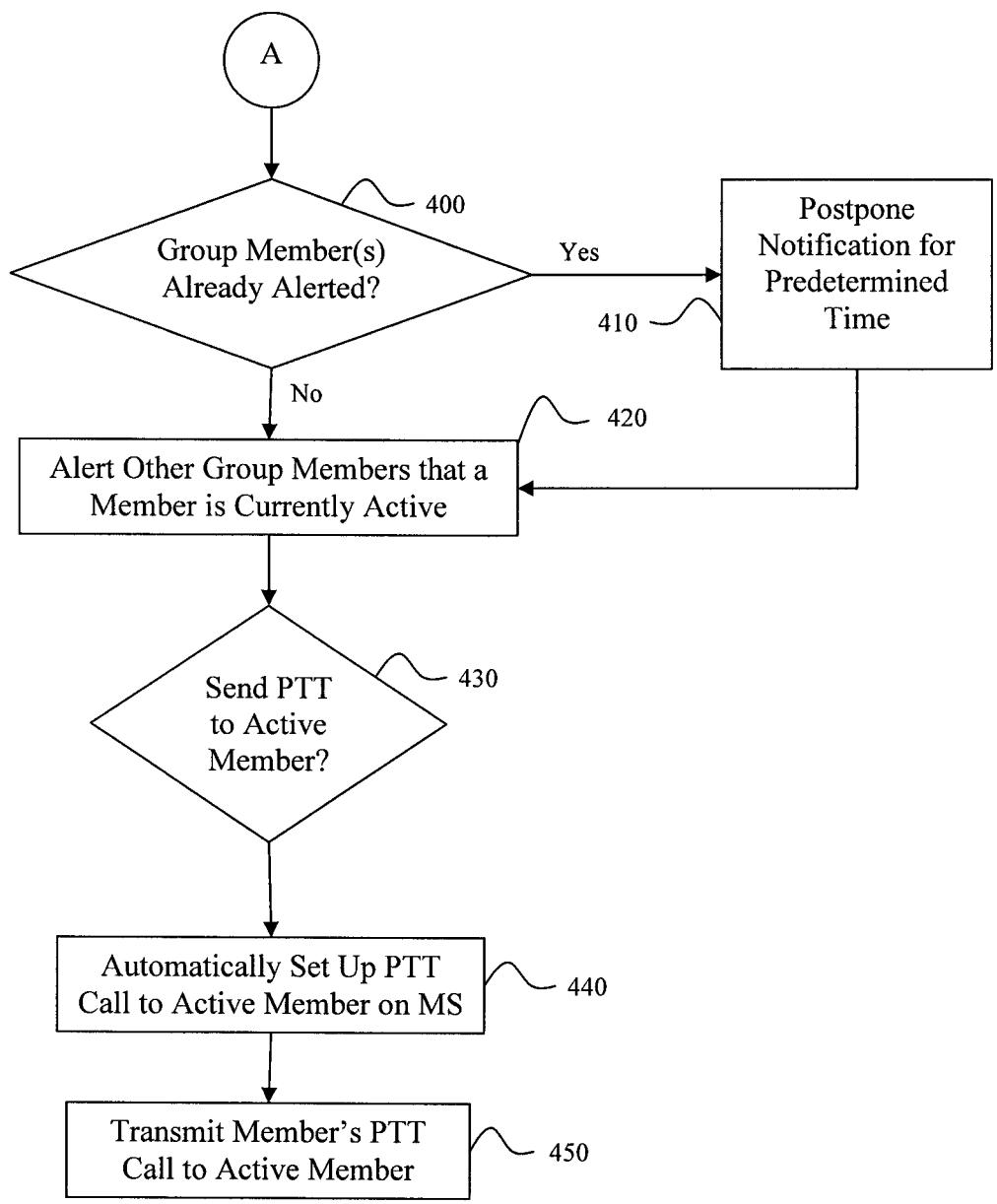
FIG. 4 illustrates an exemplary embodiment of a method for alerting members of a group that there is an active push-to-talk call that includes a member of the group, in accordance with the present invention.

FIG. 4 illustrates an exemplary embodiment of a method for alerting members of a group that there is an active push-to-talk call that includes a member of the group. In step 400, it is determined whether any of the group members of a push-to-talk social group in which one of the group members is active in a push-to-talk call have already been notified that one of their group members is active in the push-to-talk call. For any group members that have already been notified or are active in the call, in step 410, notification of the push-to-talk call activity is postponed for a predetermined period of time.

In step 420, the other group members (not including those who have recently been notified and those active in the call) are notified about the active push-to-talk call that includes (at least) one of their group members. In step 430, it is determined whether any of the other group members would like to initiate a push-to-talk call to the group member who is actively involved in the call. For example, an inquiry can be sent to the other group members in which they indicate whether they would like to initiate a push-to-talk call.

If one of the push-to-talk social group members chooses to initiate a push-to-call, then, in step 440, the mobile station of that group member is automatically set up to call the active group member. The mobile station can establish a new call with the active member or can be joined to the existing call of the active group member. In particular, a user of the mobile station could select whether to establish a new call or join an existing call from a display screen of the mobile station. Accordingly, if the active group member is involved in a one-to-one call, that call is converted into a group call to which the mobile station is joined. Thus, the initiating group member does not have to enter the active group member's mobile station number in order to initiate the call, thereby increasing the efficiency of making the call. Then, in step 450, the initiating member's push-to-talk call is transmitted to the active member when the PTT button is released.

In other exemplary embodiments of the present invention, there is a computer-readable medium encoded with computer programs for establishing a push-to-talk social group, and a computer-readable medium encoded with a computer program for alerting group members of an active push-to-talk call that includes a member of the group. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for establishing a push-to-talk social group via a mobile station is illustrated in FIG. 2, which is described above.

Another exemplary embodiment of a computer-readable medium encoded with a computer program for establishing a push-to-talk social group via an internet application is illustrated in FIG. 3, which is described above.

An exemplary embodiment of a computer-readable medium encoded with a computer program for alerting group members of an active push-to-talk call that includes a member of the group is illustrated in FIG. 4, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a push-to-talk social group, the method comprising the acts of:
   receiving at a server from a mobile station group setup information comprising a group name for the push-to-talk social group and a mobile station identifier for each member of the push-to-talk social group;
   transmitting from the server to each mobile station of the push-to-talk social group a confirmation request including an internet address for an internet application that manages communications in the push-to-talk social group in response to the group setup information;
   receiving at the server from each mobile station of the push-to-talk social group a confirmation of membership in the push-to-talk social group, including a name corresponding to each member of the push-to-talk social group;
   monitoring at a network gateway based on the received confirmations of membership in the push-to-talk social group push-to-talk calling activity to determine when a first member of the push-to-talk social group is involved in a push-to-talk call;

detecting at the network gateway a push-to-talk call including the first member of the push-to-talk social group further comprising receiving a call record for the detected call and parsing at the server the call record to determine a mobile station identifier of each of the originator mobile station and the recipient mobile station;

notifying via the network gateway a second member of the push-to-talk social group that the first member is active on the detected push-to-talk call, wherein a mobile station of the second member of the push-to-talk social group is automatically set up to call the first member to establish a one-to-one call; and joining via the network gateway the second member of the push-to-talk social group to the detected push-to-talk call based on the one-to-one call from the second member, wherein when the detected push-to-talk call is a one-to-one call, the detected push-to-talk call is converted to a group call when the second member of the push-to-talk social group is joined to the detected push-to-talk call.

2. The method of claim 1, wherein the mobile station identifier for each member of the push-to-talk social group and of each of the originator mobile station and the recipient mobile station comprises an Urban, Fleet, Mobile Station Identifier (UFMID).

3. The method of claim 1, wherein the mobile station identifier for each member of the push-to-talk social group and of each of the originator mobile station and the recipient mobile station comprises a telephone number of the mobile station.

4. The method of claim 1, wherein the group name and the mobile station identifier for each member of the push-to-talk social group are transmitted to the internet application.

5. The method of claim 1, wherein the group name and the mobile station identifier for each member of the push-to-talk social group are transmitted to a service provider.

6. The method of claim 5, wherein the group name and the mobile station identifier for each member of the push-to-talk social group are transmitted by text message.

7. A method for establishing a push-to-talk social group, the method comprising the acts of:
receiving at a server comprising an internet application that manages push-to-talk social groups, group setup information from a member of the push-to-talk social group;
sending from the server a data transmission, including an internet address of the internet application that manages push-to-talk social groups, to each member of the push-to-talk social group;
receiving at the server from each member of the push-to-talk social group a confirmation of membership in the push-to-talk social group;
monitoring at a network gateway push-to-talk calling activity to determine when a first member of the push-to-talk social group; is involved in a push-to-talk call;
detecting a push-to-talk call including the first member of the push-to-talk social group
sending a call record of the detected push-to-talk call to the internet application;
receiving, from the internet application, a mobile station identifier of an originator of the detected push-to-talk call and a mobile station identifier of a recipient of the detected push-to-talk call based on the call record;
notifying via the network gateway a second member of the push-to-talk social group that the first member is active on the detected push-to-talk call, wherein a mobile station of the second member of the push-to-talk social group is automatically set up to call the first member to establish a one-to-one call; and
joining via the network gateway the second member to the detected push-to-talk call based on the one-to-one call from the second member, wherein when the detected push-to-talk call is a one-to-one call, the detected push-to-talk call is converted to a group call when the second member of the push-to-talk social group is joined to the detected push-to-talk call.

8. The method of claim 7, further comprising the act of:
receiving at the server a confirmation of membership from each of the members of the push-to-talk social group.

9. The method of claim 7, wherein the group setup information includes a group name and a mobile station identifier of each mobile station in the push-to-talk social group.

10. The method of claim 7, further comprising the acts of:
determining at the server that the second member of the push-to-talk social group has already been informed that the first member is active on the detected push-to-talk call; and
informing via the network gateway a third member of the push-to-talk social group, without again informing the second member, that the first member is active on the detected push-to-talk call.

11. A non-transitory computer-readable medium encoded with a computer program for establishing a push-to-talk social group, the computer program comprising instructions for:
receiving group setup information from a member of the push-to-talk social group;
sending a data transmission, including an internet address of an internet application that manages push-to-talk social groups, to each member of the push-to-talk social group;
monitoring push-to-talk calling in a push-to-talk gateway application, based upon the group setup information;
detecting a push-to-talk call in which a first member of the push-to-talk social group is active;
sending a call record of the detected push-to-talk call to the internet application;
receiving, from the internet application, a mobile station identifier of an originator of the detected push-to-talk call and a mobile station identifier of a recipient of the detected push-to-talk call;
notifying a second member of the push-to-talk social group that the first member is active on the detected push-to-talk call, wherein a mobile station of the second member of the push-to-talk social group is automatically set up to call the first member to establish a one-to-one call; and
joining the second member of the push-to-talk social group to the detected call based on the one-to-one call, wherein when the detected push-to-talk call is a one-to-one call, the detected push-to-talk call is converted to a group call when the second member of the push-to-talk social group is joined to the detected push-to-talk call.

12. The computer-readable medium of claim 11, further comprising instructions for:
receiving a confirmation of membership from each of the members of the push-to-talk social group.

13. The computer-readable medium of claim 11, wherein the group setup information includes a group name and a mobile station identifier of each mobile station in the push-to-talk social group.

* * * * *